(12) United States Patent
Arazaki

(10) Patent No.: US 7,391,926 B2
(45) Date of Patent: Jun. 24, 2008

(54) CHROMATIC ABERRATION CORRECTION APPARATUS, CHROMATIC ABERRATION CORRECTION METHOD, AND CHROMATIC ABERRATION CORRECTION PROGRAM

(75) Inventor: Shinichi Arazaki, Shimosuwa-machi (JP)

(73) Assignee: Seiko Epson Corporation (JP)

( * ) Notice: Subject to any disclaimer, the term of this patent is extended or adjusted under 35 U.S.C. 154(b) by 767 days.

(21) Appl. No.: 10/785,710

(22) Filed: Feb. 24, 2004

(65) Prior Publication Data
US 2004/0247201 A1 Dec. 9, 2004

(30) Foreign Application Priority Data
Mar. 5, 2003 (JP) .............................. 2003-058456

(51) Int. Cl.
G06K 9/36 (2006.01)
(52) U.S. Cl. ........................................ 382/275; 382/167
(58) Field of Classification Search ................. 382/167, 382/275
See application file for complete search history.

(56) References Cited
U.S. PATENT DOCUMENTS
5,905,530 A 5/1999 Yokota et al.
5,917,578 A 6/1999 Nakamura
6,323,934 B1 11/2001 Enomoto
6,339,466 B1 1/2002 Matama
6,476,869 B1 11/2002 Sekine
6,937,282 B1 * 8/2005 Some et al. .................. 348/335

FOREIGN PATENT DOCUMENTS
JP 10-224695 8/1998
JP 11-161773 6/1999
JP 11-239270 8/1999

* cited by examiner

Primary Examiner—Vikkram Bali
Assistant Examiner—Eueng-Nan Yeh
(74) Attorney, Agent, or Firm—Harness, Dickey & Pierce, P.L.C.

(57) ABSTRACT

A chromatic aberration correction apparatus is provided that comprises an image storing means for storing a line image of one line of an image before correction, a correction value calculation means for correcting a chromatic aberration according to the distance from the center of the line image based on the values of the respective pixels of the line image stored in the image storing means and calculating the values of the respective pixels after correction, and an output means for outputting the line image corrected by the values of the respective pixels after correction.

18 Claims, 4 Drawing Sheets

| R33,G33 B33 | R34,G34 B34 | R35,G35 B35 | R36,G36 B36 |
|---|---|---|---|
| R43,G43 B43 | R44,G44 B44 | R45,G45 B45 | R46,G46 B46 |
| R53,G53 B53 | R54,G54 B54 | R55,G55 B55 | R56,G56 B56 |
| R63,G63 B63 | R64,G64 B64 | R65,G65 B65 | R66,G66 B66 |

(B)

| R32,G33 B35 | R33,G34 B36 | R34,G35 B37 | R35,G36 B38 |
|---|---|---|---|
| R42,G43 B45 | R43,G44 B46 | R44,G45 B47 | R45,G46 B48 |
| R52,G53 B55 | R53,G54 B56 | R54,G55 B57 | R55,G56 B58 |
| R62,G63 B65 | R63,G64 B66 | R64,G65 B67 | R65,G66 B68 | e

CHROMATIC ABERRATION CORRECTION APPARATUS, CHROMATIC ABERRATION CORRECTION METHOD, AND CHROMATIC ABERRATION CORRECTION PROGRAM

RELATED APPLICATIONS

The present application claims priority to Japanese Patent Application No. 2003-058456 filed Mar. 5, 2003 which is hereby expressly incorporated by reference in its entirety.

BACKGROUND OF THE INVENTION

1. Technical Field

The present invention relates to a chromatic aberration correction apparatus, a chromatic aberration correction method, and a chromatic aberration correction program, and more particularly, to a chromatic aberration correction apparatus, a chromatic aberration correction method, and a chromatic aberration correction program for correcting the chromatic aberration generated in a lens by image processing.

2. Related Art

Heretofore, cameras and the like converge optical information to the respective pixels of an image pick-up element through lenses. However, the lenses have various aberrations. Accordingly, the aberrations affect an image in the form of distortion (a straight line is curved in the periphery of the image), shading (an amount of light is reduced in the periphery of the image), and the like. When conditions such as cost, size and the like are not restricted, it is possible to improve the performance of a lens to such a level that the aberrations are made unnoticeable. However, there are techniques capable of correcting aberrations by image processing without using a high performance lens.

For example, there is a technique for realizing the correction of a lens by remapping the data on a memory (refer to, for example, Japanese Unexamined Patent Application Publication No. 11-161773 (FIG. 1)).

Further, there is a technique for correcting the characteristics of a lens of negative photographing in positive printing (refer to, for example, Japanese Unexamined Patent Application Publication No. 11-239270 (FIG. 1)).

Further, there is a technique for providing an image pick-up element with a random access means and outputting an image signal by making access to the data on the premise that a lens is distorted (refer to, for example, Japanese Unexamined Patent Application Publication No. 10-224695 (FIG. 1)).

As described above, the known techniques disclosed in the above Patent Documents are in common in that they electrically correct the characteristics of a lens. In these technologies, however, the characteristics of the lens are corrected using a frame memory. Further, two-dimensional mapping must be executed to obtain data after the correction has been executed. Accordingly, these technologies have a problem in that not only the frame memory is required but also a system must be realized in a complex manner even if it is realized by either hardware or software because the positions at which the mapping is executed must be calculated two-dimensionally.

An object of the present invention, which was made in view of the above circumstances, is to correct the chromatic aberration of a lens with a visually effective method using simple hardware and software, by correcting the chromatic aberration in only one direction.

SUMMARY

A chromatic aberration correction apparatus of the present invention is characterized by comprising an image input means for inputting an image in the unit of one line as a line image, a correction value calculation means for correcting the chromatic aberration according to the distance from the center of the line image based on the values of the respective pixels of the line image input by the image input means and calculating the values of the respective pixels after the chromatic aberration has been corrected, and an output means for outputting the line image corrected by the values of the respective pixels after the chromatic aberration has been corrected. Since chromatic aberration correction processing can be executed for each line only in a longitudinal direction or a lateral direction, no frame memory is necessary and hardware can be simplified. Further, since a complex calculation is not necessary, a load due to the chromatic aberration correction processing can be reduced.

Further, since human eyes have a high resolution in the lateral direction of an image, when the chromatic aberration of a lens is corrected only in the lateral direction, it can be effectively corrected with a high visual effect using simple hardware and software.

The correction value calculation means may correct the chromatic aberration of any one of the lines in a longitudinal direction and a lateral direction of the image. With this arrangement, a calculation for correcting the chromatic aberration can be easily executed using simple hardware and software.

The chromatic aberration correction apparatus of the present invention may further comprise an amount of deviation calculation means for approximating an amount of deviation for correcting the chromatic aberration according to the distance from the center of the line image by a linear function. With this arrangement, the amount of deviation can be easily calculated, and the calculation can be realized by simple hardware and software.

The chromatic aberration correction apparatus of the present invention may further comprise an amount of deviation storing means for storing an amount of deviation for correcting the chromatic aberration according to the distance from the center of the line image. With this arrangement, it is not necessary to determine the amount of deviation by a calculation each time the chromatic aberration is corrected, thereby the load due to the chromatic aberration correction processing can be reduced. Further, the present invention can cope with a case in which it is difficult to approximate the amount of deviation linearly and thus a complex calculation is required.

Further, the data of the image input by the image input means may be composed of RGB pixel data, and the chromatic aberration may be corrected making use of the deviation of aberration of each color using the RGB pixel data.

Further, the correction value calculation means may restrict the minimum unit of the amount of deviation for correcting the chromatic aberration according to the distance from the center of the line image so that the minimum unit is set to 2 raised to the power. With this arrangement, a calculation for correcting the chromatic aberration can be simplified and executed at a high speed using simply arranged hardware and software.

A chromatic aberration correction method of the present invention is characterized by comprising an image input step of inputting an image in the unit of one line as a line image, a correction value calculation step of correcting the chromatic aberration according to the distance from the center of the line image based on the values of the respective pixels of the line image input at the image input step and calculating the values of the respective pixels after the chromatic aberration has been corrected, and an output step of outputting the line image corrected by the values of the respective pixels after the chromatic aberration has been corrected. Since the chromatic aberration correction processing can be executed for each line only in the longitudinal direction or the lateral direction, no frame memory is necessary and the hardware can be simplified. Further, since no complex calculation is necessary, the load due to the chromatic aberration correction processing can be reduced.

A chromatic aberration correction program of the present invention is characterized in that the program causes the chromatic aberration correction apparatus to execute an image input step of inputting the image in the unit of one line as a line image, a correction value calculation step of correcting the chromatic aberration according to the distance from the center of the line image based on the values of the respective pixels of the line image input at the image input step and calculating the values of the respective pixels after the chromatic aberration has been corrected, and an output step of outputting the line image corrected by the values of the respective pixels after the chromatic aberration has been corrected. Since the chromatic aberration correction processing can be executed for each line only in the longitudinal direction or the lateral direction, no frame memory is necessary and the hardware can be simplified. Further, since the complex calculation is not necessary, the load due to the chromatic aberration correction processing can be reduced.

BRIEF DESCRIPTION OF THE DRAWINGS

FIG. 3 is a view showing the luminance values of respective pixels before and after the chromatic aberration thereof is corrected.

FIG. 6 is a view explaining actual chromatic aberration correction processing.

DETAILED DESCRIPTION

Figure 1:
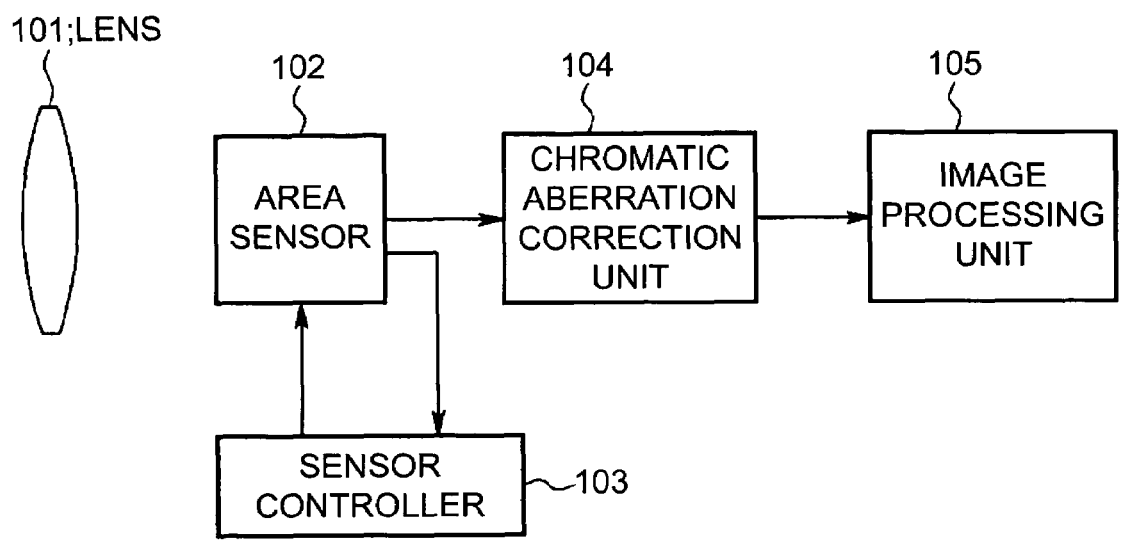
FIG. 1 is a block diagram showing an example of the arrangement of an embodiment of the present invention.

FIG. 1 is a block diagram showing an example of the arrangement of a chromatic aberration correction apparatus of an embodiment of the present invention. As shown in the figure, this embodiment is composed of a lens 101, an area sensor 102, a sensor controller 103, a chromatic aberration correction unit 104, and an image processing unit 105. The lens 101 converges light and forms the image of an object on the area sensor 102, the area sensor 102 outputs image data corresponding to the image that is optically converged from an object by the lens 101 and formed thereby, the sensor controller 103 controls the area sensor 102, the chromatic aberration correction unit 104 corrects the chromatic aberration (a phenomenon that the focal position of each color is more deviated as it is located nearer to the periphery of a lens) of the image data output from the area sensor 102, and the image processing unit 105 subjects the image data, which has been subjected to chromatic aberration correction processing by the chromatic aberration collection unit 104, to various types of processing such as color interpolation processing and the like.

Further, the chromatic aberration correction unit 104 is composed of an image input unit (not shown), a correction value calculation unit (not shown), a corrected image output unit (not shown), a amount of deviation calculation unit (not shown), and the like. The image input unit inputs image data before correction as a line image, the correction value calculation unit subjects the respective pixels constituting the line image input from the image input unit to chromatic aberration correction processing and calculates the correction values of the respective pixels, the corrected image output unit outputs a line image after correction that is composed of the correction values of the respective pixels calculated by the correction value calculation unit, and the amount of deviation calculation unit calculates the amount of deviation for correcting the chromatic aberration according to the distance from the center of the lens.

The chromatic aberration is a phenomenon that R (red), G (green), and B (blue) light, which are to be converged at the same position, are more deviated therefrom as they are located farther apart from a main axis (center of an image) on an image surface formed on the area sensor 102, although they are converged at a center regardless of a wavelength when they are located on the main axis. This deviation is corrected by image processing in this embodiment.

Figure 2:
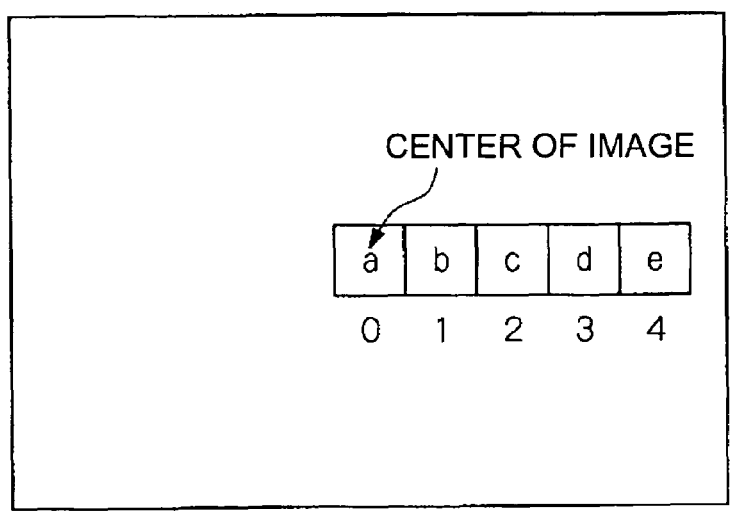
FIG. 2 is a view showing a partial image defined to correct a chromatic aberration.

FIG. 2 is a view showing partial images that are defined to evaluate the correction of chromatic aberration. An image to be corrected is partitioned into the small partial images. Here, the correction of the chromatic aberration is evaluated by giving attention only to the partial images disposed in the right direction from the center of the image.

Table 1 shows the amounts of deviation of the respective pixels in the partial images. The amounts of deviation show the amounts of deviation of R (red) and B (blue) images when the position of, for example, a G (green) image is used as a reference. In Table 1, the amounts of deviations are calculated on the assumption that they are deviated linearly.

TABLE 1

| Distance from the center of lens and symbol | 0<br>a | 1<br>b | 2<br>c | 3<br>d | 4<br>e |
|---|---|---|---|---|---|
| Theoretical value of amount of deviation R | 0 | 0.30 | 0.60 | 0.91 | 1.21 |
| Theoretical value of amount of deviation B | 0 | −0.47 | −0.94 | −1.41 | −1.88 |
| Amount of deviation to be used R | 0 | 0 | 1.0 | 1.0 | 1.0 |
| Amount of deviation to be used B | 0 | 0 | −1.0 | −1.0 | −2.0 |

Here, it is assumed that the amounts of deviation are proportional to the distance from the center of the image, and the embodiment will be explained below on the premise that the amounts of deviation of the respective pixels of the partial images can be determined by the following Equation (1), where the amount of deviation of the pixel located at the position farthest from the center of the image (an actually measured value or calculated value) is shown by n, the lateral distances of the respective partial images from the center of the image are shown by x, and the distances from the center of the image to the lateral ends of the respective partial images are shown by w.

$$\text{Amount of deviation of each pixel of each partial image} = n/(w/2)*x \qquad \text{Equation (1)}$$

(where, "*" shows multiplication).

As shown in Table 1, the amounts of deviation of a partial image a are 0. The theoretical values of the amounts of deviation of the R (red) and B (blue) images in a partial image b (amounts of deviation determined from Equation (1)) are 0.30 and −0.47, respectively. Since the minimum unit of correction of the chromatic aberration is set to one pixel here, the amounts of deviation in the partial image b, which are actually used by the chromatic aberration correction unit 104 to correct the chromatic aberration, is 0.

Further, the theoretical values of the amounts of deviation of the R (red) and B (blue) images in a partial image c is 0.60 and −0.94, respectively. The embodiment will be explained here by setting the minimum unit of correction of the chromatic aberration to one pixel. At this time, the amounts of deviation of the R and B images in the partial image c, which are actually used by the chromatic aberration correction unit 104 to correct the chromatic aberration, are 1 and −1, respectively.

Further, the theoretical values of the amounts of deviation of the R (red) and B (blue) images in a partial image d are 0.91 and −1.41, respectively. Since the minimum unit of correction of the chromatic aberration is set to one pixel here, the amounts of deviation of the R and B images in the partial image d, which are actually used by the chromatic aberration correction unit 104 to correct the chromatic aberration, are 1 and −1, respectively.

Further, the theoretical values of the amounts of deviation of the R (red) and B (blue) images in a partial image e are 1.21 and −1.88, respectively. Since the minimum unit of correction of the chromatic aberration is set to one pixel here, the amounts of deviation of the R and B images in the partial image e, which are actually used by the chromatic aberration correction unit 104 to correct the chromatic aberration, are 1 and −2, respectively.

The chromatic aberration can be corrected by a simple circuit using a shift calculation and an adding/subtracting calculation by restricting the minimum unit of the theoretical value of the amount of deviation to 2 raised to the power ($2^m$ (m shows a natural number)).

FIG. 3(A) shows an example of the RGB luminance values of the respective pixels included by the partial image e before the chromatic aberration thereof is corrected. In the figure, Rxx shows that the luminance value of an R pixel is Rxx. Likewise, Gyy shows that the luminance value of a G pixel is Gyy. Further, Bzz shows that the luminance value of a B pixel is Bzz.

FIG. 3(B) shows an example of the luminance values of the respective pixels included in the partial image e after the chromatic aberration thereof has been corrected when the position of the G (green) image is used as the reference. For example, in the second column from the left of the uppermost row of FIG. 3(A), the luminance values of R, G, and B pixels are R34, G34, and B34, respectively. As shown in FIG. 3(B), after the chromatic aberrations of these pixels have been corrected, the luminance value of the R pixel is R33, the luminance value of the G pixel is G34 and is not changed, and the luminance value of the B pixel is B36. That is, the luminance value R33 of the R pixel after the chromatic aberration thereof has been corrected corresponds to the luminance value R33 of the R pixel in the leftmost column (first column from the left) of the uppermost row before the chromatic aberration thereof is corrected. Further, the luminance value B36 of the B pixel after the chromatic aberration thereof has been corrected corresponds to the luminance value B36 of the B pixel in the rightmost column (fourth column from the left) of the uppermost row before the chromatic aberration thereof is corrected.

Next, the case, in which a numerical value equal to or less than 1 is used as the minimum unit of the amount of deviation, will be explained. As to a predetermined R (red) pixel R0 to be corrected, the distance between pixels is set to 1 and an amount of deviation is set to a. Further, two pixels whose positions are nearest to the amount of deviation are shown by R1 and R2. When the distance between the pixel R1 and the amount of deviation a is shown by a1 and the distance between the pixel R2 and the amount of deviation a is shown by a2, the pixel value of the pixel R0 to be corrected can be determined by the following Equation (2) after the chromatic aberration thereof has been corrected.

$$\text{Pixel value of } R0 = a2 \times R1 + a1 \times R2 \quad \text{Equation (2)}$$

Likewise, as to a predetermined B (blue) pixel B0 to be corrected, the distance between pixels is set to 1 and an amount of deviation is set to b. Further, two pixels whose positions are nearest to the amount of deviation are shown by B1 and B2. When the distance between the pixel B1 and the amount of deviation b is shown by b1 and the distance between the pixel B2 and the amount of deviation b is shown by b2, the pixel value of the pixel to be corrected B0 can be determined by the following equation (3) after it has been corrected after the chromatic aberration thereof has been corrected.

$$\text{Pixel value of } B0 = b2 \times B1 + b1 \times B2 \quad \text{Equation (3)}$$

Further, when the amount of deviation of the chromatic aberration is corrected linearly, it can be determined by Equation (1). However, when the amount of deviation is corrected non-linearly, a complex calculation is required. To cope with this problem, n in Equation (1) must be set to minimize the error of the amount of deviation, or there is a case that a non-linear amount of deviation must be set. Thus, the amount of deviation may be previously determined by a calculation and stored in a table so that it can be referred to when necessary. Further, when the amounts of deviation that correspond to the distances from the center of a lens is previously calculated and a table, in which the distances from the center of the lens are related to the amounts of deviation, is prepared, the amount of deviation that corresponds to a distance from the center of the lens can be easily read out from the table, which permits the chromatic aberration to be promptly corrected because it is not necessary to calculate the amount of deviation each time the chromatic aberration is corrected.

Next, a result of evaluation of the correction of the chromatic aberration of this embodiment will be explained. In this case, the minimum unit of the amount of deviation is set to the one pixel. The chromatic aberration is evaluated here using two evaluation parameters, that is, a passing characteristic and a pseudo color mixing ratio. The passing characteristic determines whether the result of correction of the chromatic aberration is good or bad depending on the degree of amplitude of an output with respect to the amplitude of input black and white. Basically, the result of correction of the chromatic aberration is determined depending on the amplitude characteristic of luminance. However, since the color spaces of RGB are not specified, the luminance Y is defined by the following equation (4) taking it into consideration that generally the luminance Y is considerably controlled by G.

$$Y = (G + (R+B)/2)/2 = (R + 2G + B)/4 \quad \text{Equation (4)}$$

Since the amplitude of the input is created so as to be theoretically set to a value from 0 to 255, the result of correction of the chromatic aberration is evaluated only by the magnitude of the amplitude of the output. Further, since it is contemplated that the amplitude is varied depending on a sampling point, the evaluation is executed for each partial image, and the average of the differences between the maximum values and the minimum values of image values is used as an evaluation value. The passing characteristic T can be determined by the following Equation (5).

$$T = \text{average}(\text{Max}(Y) - \text{Min}(Y)) \quad \text{Equation (5)}$$

Since an original image is created as data having the amplitude from 0 to 255, T is a numerical value equal to or less than 255, and it can be said that the original image having a numerical value nearer to 255 has a higher performance of the correction of the chromatic aberration.

Figure 4:
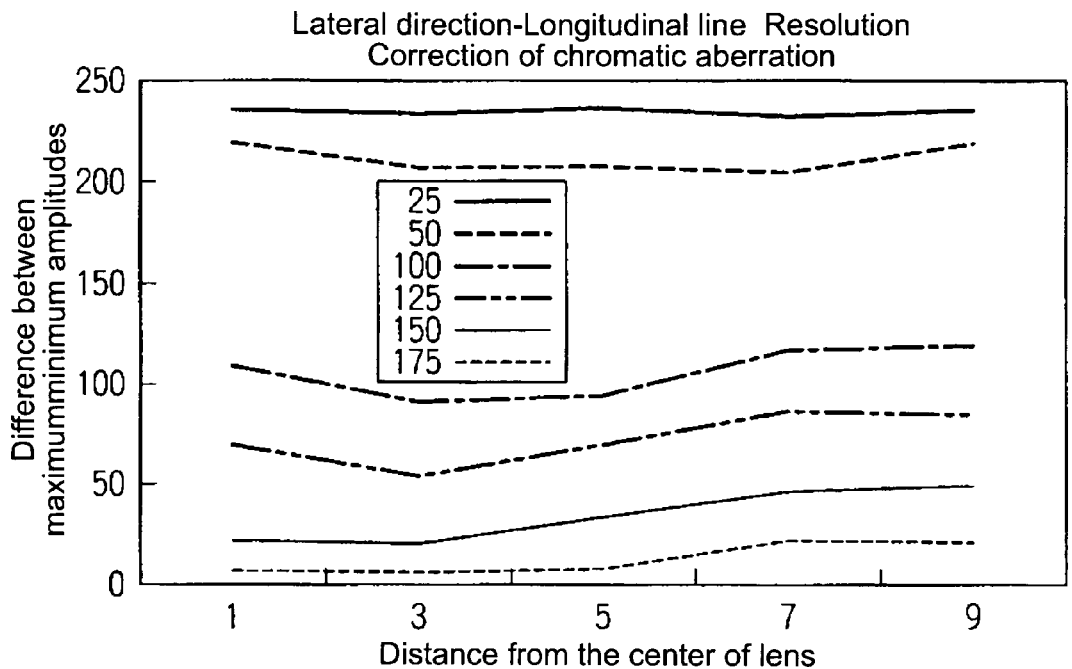
FIG. 4 is a graph showing the passing characteristic of an image after the chromatic aberration thereof has been corrected.

FIG. 4 is a graph showing the passing characteristic of images having respective resolutions (25 lines/image, 50 lines/image, 100 lines/image, 125 lines/image, 150 lines/image, and 175 lines/image) after the chromatic aberration thereof has been corrected. A vertical axis shows the difference between a maximum amplitude and a minimum amplitude, and a lateral axis shows the distance from the center of the images (center of the lens). It can be found from the graph that a good result can be obtained without the deterioration of the passing characteristic even at the ends of the images.

In contrast, the pseudo color mixing ratio determines whether the result of correction of the chromatic aberration is good or bad depending on the degree of a color applied to the intrinsic color of the image. The pseudo color mixing ratio C can be determined by the following Equation (6). When the chromatic aberration is properly corrected, the application of color due to the color aberration of a lens must be near to 0.

$$C = \text{average}(\text{Max}(R,G,B) - \text{Min}(R,G,B))/Y \quad \text{Equation (6)}$$

In Equation (6), Y shows the luminance defined by Equation (4). When attention is given to the degree of generation of color, since the intensity of the color is in proportion to the luminance, it is divided by the luminance Y for normalization. The degrees of generation of color of respective pixels are determined, and the average of them is used as a pseudo color generation ratio (the average of the degrees of generation of color of the pixels except a green pixel of each partial image is determined and, this average are calculated as the pseudo color mixing ratio). In a black and white image as the original image, C 0, and it can be said that a better result can be obtained when the value of C is nearer to 0 also in an output image.

Figure 5:
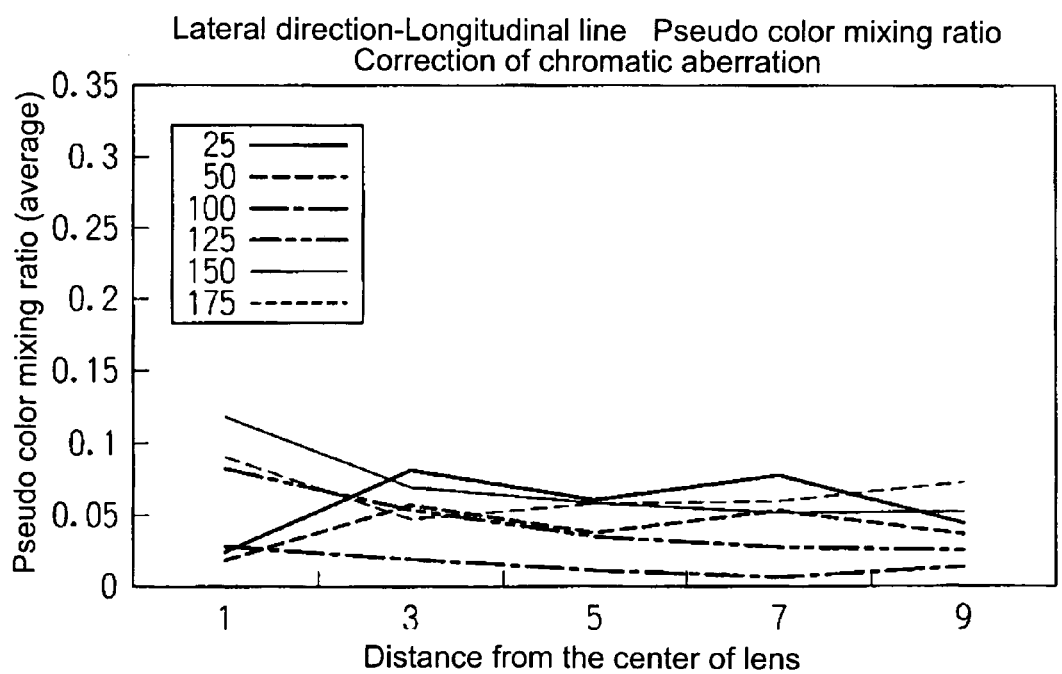
FIG. 5 is a graph showing the pseudo color mixing ratio of an image after the chromatic aberration thereof has been corrected.

FIG. 5 is a graph showing the pseudo color mixing ratio of images having respective resolutions (25 lines/image, 50 lines/image, 100 lines/image, 125 lines/image, 150 lines/image, and 175 lines/image) after the chromatic aberration thereof has been corrected. A vertical axis shows the pseudo color mixing ratio (average value), and a lateral axis shows the distance from the center of the images (center of the lens). It can be found from the graph that a good result can be obtained without the reduction of the pseudo color mixing ratio even at the ends of the image.

The amounts of deviation shown in Table 1 are used for evaluation and the minimum unit of the amounts of deviation is set to 1. In actual processing, however, a decimal fraction such as 0.25 is preferably used as the minimum unit. The actual processing will be explained below with reference to FIGS. 2 and 6.

TABLE 2

| Distance from the center of lens and symbol | 0 a | 1 b | 2 c | 3 d | 4 e |
|---|---|---|---|---|---|
| Theoretical value of amount of deviation R | 0 | 0.30 | 0.60 | 0.91 | 1.21 |
| Theoretical value of amount of deviation B | 0 | −0.47 | −0.94 | −1.41 | −1.88 |

TABLE 2-continued

| Distance from the center of lens and symbol | 0 a | 1 b | 2 c | 3 d | 4 e |
|---|---|---|---|---|---|
| Amount of deviation to be used R | 0 | 0.25 | 0.50 | 1.0 | 1.25 |
| Amount of deviation to be used B | 0 | −0.50 | −1.0 | −1.5 | −1.75 |

Table 2 shows the amounts of deviation of the partial images a to e in FIG. 2. As shown in Table 2, the amounts of deviation of the partial image a is 0. Further, the theoretical values of the amounts of deviation of the R (red) and B (blue) images in the partial image b are 0.30 and −0.47, respectively. Since the minimum unit of the correction of the chromatic aberration is set to 0.25 pixel here, the amounts of deviation of the R and B images in the partial image b, which are actually used by the chromatic aberration correction unit 104 to correct the chromatic aberration, are 0.25 and −0.50, respectively.

Further, the theoretical values of the amounts of deviation of the R (red) and B (blue) images in the partial image c are 0.60 and −0.94, respectively. Since the minimum unit of the correction of the chromatic aberration is set to 0.25 pixel here, the amounts of deviation of the R and B images in the partial image c, which are actually used by the chromatic aberration correction unit 104 to correct the chromatic aberration, are 0.50 and −1.0, respectively.

Further, the theoretical values of the amounts of deviation of the R (red) and B (blue) images in the partial image d are 0.91 and −1.41, respectively. Since the minimum unit of the correction of the chromatic aberration is set to 0.25 pixel here, the amounts of deviation of the R and B images in the partial image d, which are actually used by the chromatic aberration correction unit 104 to correct the chromatic aberration, are 1.0 and −1.50, respectively.

Further, the theoretical values of the amounts of deviation of the R (red) and B (blue) images in the partial image e are 1.21 and −1.88, respectively. Since the minimum unit of the chromatic aberration correction is set to 0.25 pixel here, the amounts of deviation of the R and B images in the partial image e, which are actually used by the chromatic aberration correction unit 104 to correct the chromatic aberration, are 1.25 and −1.75, respectively. The minimum unit of the theoretical value of the amount of deviation can be restricted to 1.0, 0.5, 0.25, 0.125, . . . etc. The chromatic aberration can be corrected by the simple circuit using the shift calculation and the adding/subtracting calculation by restricting the theoretical value of the minimum unit of the amount of deviation particularly to 2 raised to the power ($2^m$ (m shows a natural number).

FIG. 6 shows the arrangement of pixels when attention is given to an arbitrary one line. It is assumed in FIG. 6 that R32, G32, and B32 are located at the same position. This arrangement is also the same in other pixels. Chromatic aberration for the position of the partial image e in FIG. 2 is corrected by giving attention to the arrangement of the pixels in FIG. 6. The pixel value of the pixel R35 can be determined by the following Equation (7).

$$R35 = 0.25 * R33 + 0.75 * R34 \quad \text{Equation (7)}$$

The pixel value of the pixel R35 can be determined by the following Equation (8).

$$G35 = G35 \quad \text{Equation (8)}$$

The pixel value of the pixel R G35 can be determined by the following Equation (8).

$$B35 = 0.25*B36 + 0.75*B37 \qquad \text{Equation (9)}$$

As described above, the values of the pixels can be calculated by assigning a weight, which is in proportion to the distance from the center of the image, to the amount of deviation.

As described above, this embodiment corrects the chromatic aberration of a lens particularly by image processing. In particular, processing can be simply executed because mapping processing can be executed only one-dimensionally by executing the correction of the chromatic aberration only in a line direction. The affect of the chromatic aberration appears only in a view point of "resolution" as long as an image is not viewed in enlargement. Further, in the human sense of sight, the sensitivity to the resolution of an image is relatively higher in the lateral direction of the image than in the vertical direction thereof. Accordingly, the quality of an object image can be improved by improving the resolution in the lateral direction.

Further, the amount of data necessary to the calculation can be greatly reduced by obtaining the data (amount of deviation) used to correct the chromatic aberration of one image by the same calculation. Otherwise, when the data (amount of deviation) for the correction of the chromatic aberration of one image is kept for only one line and used to all the lines of the one image, it is not necessary to recalculate the data (amount of deviation) each time the chromatic aberration is corrected, thereby a load can be reduced. Further, the chromatic aberration can be corrected over the entire image in an approximately practical satisfactory level. Further, although the distortion of a lens is a function of the distance from the center of the lens, even if the function is simplified to the function of only the lateral distance of an image, a practical and effective result can be obtained.

Further, an effective correction can be realized by very light hardware (H/W) or software (S/W). The thickness of a device can be reduced or other performances of the device can be improved by correcting the chromatic aberration by the image processing. Otherwise, the number of lenses can be reduced. That is, since a severe performance is not optically required for the chromatic aberration, a degree of freedom can be increased in the design of a lens.

Note that although the chromatic aberration is corrected only in the lateral direction, it can be corrected only in a longitudinal direction or in the longitudinal and lateral directions. Further, the chromatic aberration may be corrected by switching the lateral direction and the longitudinal direction.

Further, although the positions of the B (blue) and R (red) images are corrected using the position of the G (green) image as the reference, the position of the R or B image may be used as the reference. Further, all the R, G, B images may be corrected so that the colors of the respective pixels are corrected to the positions where the respective colors are to be intrinsically focused in place of the positions of the other colors that are corrected to the position of any one color.

Although the chromatic aberration correction processing is executed by the hardware in the above embodiment, a computer may execute the chromatic aberration correction processing based on a predetermined program.

Further, it goes without saying that the arrangement and the operation of the above embodiment are only examples and may be appropriately changed within a range which does not depart from the gist of the present invention.

What is claimed is:

1. A chromatic aberration correction apparatus for executing correction of chromatic aberration for a predetermined image, comprising:
   image input means for inputting the image as a plurality of line images, each line image having a plurality of partial images;
   correction value calculation means for correcting the chromatic aberration of values of respective pixels for each of the partial images of a respective line image according to a distance from a center of the respective line image based on the values of the respective pixels of the respective line image and calculating the values of the respective pixels for each of the partial images of the respective line image after the chromatic aberration has been corrected based on an amount of deviation of a pixel located at a position farthest from a center of one of the line images, a distance of a respective partial image from the center of the respective line image, and a distance from the center of the respective line image to an end of the respective partial image; and
   output means for outputting the respective line image corrected by the values of the respective pixels after the chromatic aberration has been corrected.

2. A chromatic aberration correction apparatus according to claim 1, wherein the correction value calculation means corrects the chromatic aberration of any one of lines in a longitudinal direction or a lateral direction of the image.

3. A chromatic aberration correction apparatus according to claim 1, further comprising amount of deviation calculation means for approximating an amount of deviation for correcting the chromatic aberration according to the distance from the center of the respective line image by a linear function.

4. A chromatic aberration correction apparatus according to claim 1, further comprising amount of deviation storing means for storing an amount of deviation for correcting the chromatic aberration according to the distance from the center of the respective line image.

5. A chromatic aberration correction apparatus according to claim 1, wherein the data of the image input by the image input means is composed of RGB pixel data, and the chromatic aberration is corrected making use of a deviation of aberration of each color using the RGB pixel data.

6. A chromatic aberration correction apparatus according to claim 1, wherein the correction value calculation means restricts a minimum unit of the amount of deviation for correcting the chromatic aberration according to the distance from the center of the respective line image so that the minimum unit is set to 2 raised to a power.

7. A chromatic aberration correction method of executing a correction of chromatic aberration for a predetermined image, comprising:
   an image input step of inputting the image as a plurality of line images, each line image having a plurality of partial images;
   a correction value calculation step of correcting the chromatic aberration of values of respective pixels for each of the partial images of a respective line image input by the image input step according to a distance from a center of the respective line image based on the values of the respective pixels of the respective line image input at the image input step and calculating the values of the respective pixels for each of the partial images of the respective line image after the chromatic aberration has been corrected based on an amount of deviation of a pixel located at a position farthest from a center of one of the lime images, a distance of a respective partial image from the center of the respective line image, and a distance from the center of the respective line image to an end of the respective partial image; and an output step of outputting the respective line image corrected by the values of the respective pixels after the chromatic aberration has been corrected.

8. A computer readable medium storing a chromatic aberration correction program for controlling a chromatic aberration correction apparatus for executing a correction of chromatic aberration for a predetermined image, wherein the program causes the chromatic aberration correction apparatus to execute:

an image input step of inputting the image as a plurality of line images, each line image having a plurality of partial images;

a correction value calculation step of correcting the chromatic aberration of values of respective pixels for each of the partial images of a respective line image input by the image input step according to a distance from a center of the respective line image based on the values of the respective pixels of the respective line image input at the image input step and calculating the values of the respective pixels for each of the partial images of the respective line image after the chromatic aberration has been corrected based on an amount of deviation of a pixel located at a position farthest from a center of one of the line images, a distance of a respective partial image from the center of the respective line image, and a distance from the center of the respective line image to an end of the respective partial image; and an output step of outputting the respective line image corrected by the values of the respective pixels after the chromatic aberration has been corrected.

9. A chromatic aberration correction apparatus for executing correction of chromatic aberration for a predetermined image, comprising:

an area sensor for inputting the image as a plurality of line images, each line image having a plurality of partial images;

a chromatic aberration correction unit for correcting the chromatic aberration of values of respective pixels for each of the partial images of a respective line image input by the area sensor according to a distance from a center of the respective line image based on the values of the respective pixels of the respective line image and calculating the values of the respective pixels of the respective line image after the chromatic aberration has been corrected based on an amount of deviation of a pixel located at a position farthest from a center of one of the line images, a distance of a respective partial image from the center of the respective line image, and a distance from the center of the respective line image to an end of the respective partial image; and an output for outputting the respective line image corrected by the values of the respective pixels after the chromatic aberration has been corrected.

10. A chromatic aberration correction apparatus according to claim 9, wherein the chromatic aberration correction unit corrects the chromatic aberration of any one of lines in a longitudinal direction or a lateral direction of the image.

11. A chromatic aberration correction apparatus according to claim 9, wherein the chromatic aberration correction unit includes an amount of deviation calculation unit for approximating an amount of deviation for correcting the chromatic aberration according to the distance from the center of the respective line image by a linear function.

12. A chromatic aberration correction apparatus according to claim 9, wherein the chromatic aberration correction unit includes a computer readable medium for storing an amount of deviation for correcting the chromatic aberration according to the distance from the center of the respective line image.

13. A chromatic aberration correction apparatus according to claim 9, wherein the data of the image input by the image input means is composed of RGB pixel data, and the chromatic aberration is corrected making use of a deviation of aberration of each color using the RGB pixel data.

14. A chromatic aberration correction apparatus according to claim 9, wherein the chromatic aberration correction unit restricts a minimum unit of the amount of deviation for correcting the chromatic aberration according to the distance from the center of the respective line image so that the minimum unit is set to 2 raised to a power.

15. A chromatic aberration correction apparatus according to claim 1, wherein the amount of deviation of the pixel located at the position farthest from the center of one of the line images is calculated based on a first line from the plurality of line images and used in calculating the values of the respective pixels for each of the partial images of each of the remaining line images of the plurality of partial images.

16. A chromatic aberration correction method according to claim 7, wherein the amount of deviation of the pixel located at the position farthest from the center of one of the line images is calculated based on a first line from the plurality of line images and used in calculating the values of the respective pixels for each of the partial images of each of the remaining line images of the plurality of partial images.

17. A computer readable medium according to claim 8, wherein the amount of deviation of the pixel located at the position farthest from the center of one of the line images is calculated based on a first line from the plurality of line images and used in calculating the values of the respective pixels for each of the partial images of each of the remaining line images of the plurality of partial images.

18. The chromatic aberration correction apparatus according to claim 9, wherein the amount of deviation of the pixel located at the position farthest from the center of one of the line images is calculated based on a first line from the plurality of line images and used in calculating the values of the respective pixels for each of the partial images of each of the remaining line images of the plurality of partial images.

* * * * *